United States Patent
Pearson et al.

(10) Patent No.: US 7,383,265 B2
(45) Date of Patent: Jun. 3, 2008

(54) SYSTEM AND METHOD FOR REGULATING AN EXTENSIBILITY POINT'S ACCESS TO A MESSAGE

(75) Inventors: Malcolm E. Pearson, Kirkland, WA (US); Steven D. White, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 11/068,074

(22) Filed: Feb. 28, 2005

(65) Prior Publication Data

US 2006/0195457 A1 Aug. 31, 2006

(51) Int. Cl.
G06F 17/30 (2006.01)
G06F 7/00 (2006.01)

(52) U.S. Cl. .............................. 707/10; 707/9; 707/101; 707/104.1

(58) Field of Classification Search .................. 707/10, 707/101, 104.1, 9
See application file for complete search history.

(56) References Cited

U.S. PATENT DOCUMENTS

| | | | |
|---|---|---|---|
| 6,658,004 B1 * | 12/2003 | Kadansky et al. .......... 370/394 |
| 6,748,555 B1 | 6/2004 | Teegan et al. ................. 714/38 |
| 7,032,030 B1 * | 4/2006 | Codignotto .................. 709/246 |
| 2002/0120697 A1 * | 8/2002 | Generous et al. ........... 709/206 |
| 2004/0010591 A1 | 1/2004 | Sinn et al. ................... 709/225 |
| 2005/0132417 A1 * | 6/2005 | Bobrovskiy et al. ........ 725/134 |
| 2005/0149630 A1 * | 7/2005 | Smolinski et al. .......... 709/227 |
| 2005/0278410 A1 * | 12/2005 | Espino ....................... 709/201 |
| 2007/0107053 A1 * | 5/2007 | Shraim et al. ................. 726/22 |
| 2007/0107059 A1 * | 5/2007 | Chasin et al. ................. 726/23 |

FOREIGN PATENT DOCUMENTS

WO WO 03/044716 A2 5/2003

* cited by examiner

Primary Examiner—Kuen S. Lu
(74) Attorney, Agent, or Firm—Woodcock Washburn LLP

(57) ABSTRACT

Prior to sending a message to an extensibility point, the message is wrapped with a wrapper object associated with the extensibility point. The wrapper object can be validated by the extensibility point when the extensibility point is ready to commence its operation on the message. Validation of the wrapper object enables the extensibility point to access the message. The wrapper object can later be invalidated by the extensibility point when the extensibility point has completed its operation on the message. Invalidation of the wrapper object denies the extensibility point access to the message.

18 Claims, 4 Drawing Sheets

SYSTEM AND METHOD FOR REGULATING AN EXTENSIBILITY POINT'S ACCESS TO A MESSAGE

FIELD OF THE INVENTION

The present invention relates to the field of email transfer and delivery, and, more specifically, to regulating an extensibility point's access to an email message during the transfer and delivery processes.

BACKGROUND OF THE INVENTION

A message transfer agent (MTA) is a program responsible for receiving incoming email and delivering the email message to individual users. Generally, the MTA is a processing pipeline that receives a message from an external source, categorizes and routes the message to the appropriate recipients, and then sends the message to the proper destinations. Frequently, when processing a message within the MTA, it is desirable to hand over the message to an extensibility point that allows an external operation to be performed upon the message. For example, an extensibility point may be invoked to scan a message for a virus, to determine whether there should be an intercepting party for a message, to add a disclaimer to a message, or to cease communication with a party sending spam mail. These external operations may involve execution of external code and may run out of process or require invocation of a remote service.

In simple a case, an extensibility point will receive a message from the MTA, fully perform its operation on the message, and then return the message to the MTA for further processing. In a more complicated case, however, it may not be possible for the extensibility point to fully execute its operation when the message is first received. Accordingly, to avoid unnecessary delay of the transfer and delivery processes, the extensibility point may partially execute its operation, return the message to the MTA, and then later re-access the message from the MTA to complete the operation. In this more complicated scenario, the extensibility point may flag the message prior to returning it to the MTA. The extensibility point will remove the flag only after it has re-accessed the message and completed its operation. To ensure that the message will not be distributed until the operation is completed, the MTA will not distribute the message until the flag has been removed.

While this extensibility point return creates improved message processing efficiency, it also results in a number of message accessing problems. In particular, an extensibility point may not remove a message flag when an operation is completed. Also, even if a flag has already been removed, an extensibility point may nevertheless attempt to inappropriately access a message. In fact, an extensibility point may attempt to inappropriately duplicate the same operation on a single message. In some cases, an extensibility point may even attempt to access a message on which it is not intended to perform any operation at all or which is meant to be handed over to a different extensibility point. These and other accessing errors may result in unnecessary delay to message distribution and, in some cases, may even prevent some recipients from ever receiving a message. Additionally, these accessing errors may result in a failure to fully and/or correctly perform extensibility point operations and may damage message content or even the overall performance of the email system. Accordingly, there is a need in the art for systems and methods for regulating an extensibility point's access to a message.

SUMMARY OF THE INVENTION

The present invention is directed to systems and methods for regulating an extensibility point's access to a message. Prior to sending the message to the extensibility point, the message is wrapped with a wrapper object associated with the extensibility point. The wrapper object can be validated by the extensibility point when it is ready to commence its operation on the message. Validation of the wrapper object enables the extensibility point to access the message. The wrapper object can later be invalidated by the extensibility point when it is has completed its operation on the message. Invalidation of the wrapper object denies the extensibility point access to the message. If the extensibility point has only partially executed its operation on the message, then the validated wrapped message can be returned to the message transfer agent and then re-accessed by the extensibility point at a later time. If the extensibility point attempts to access the message after the wrapper object has been invalidated, then an exception may be generated or the unauthorized access may simply have no effect.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
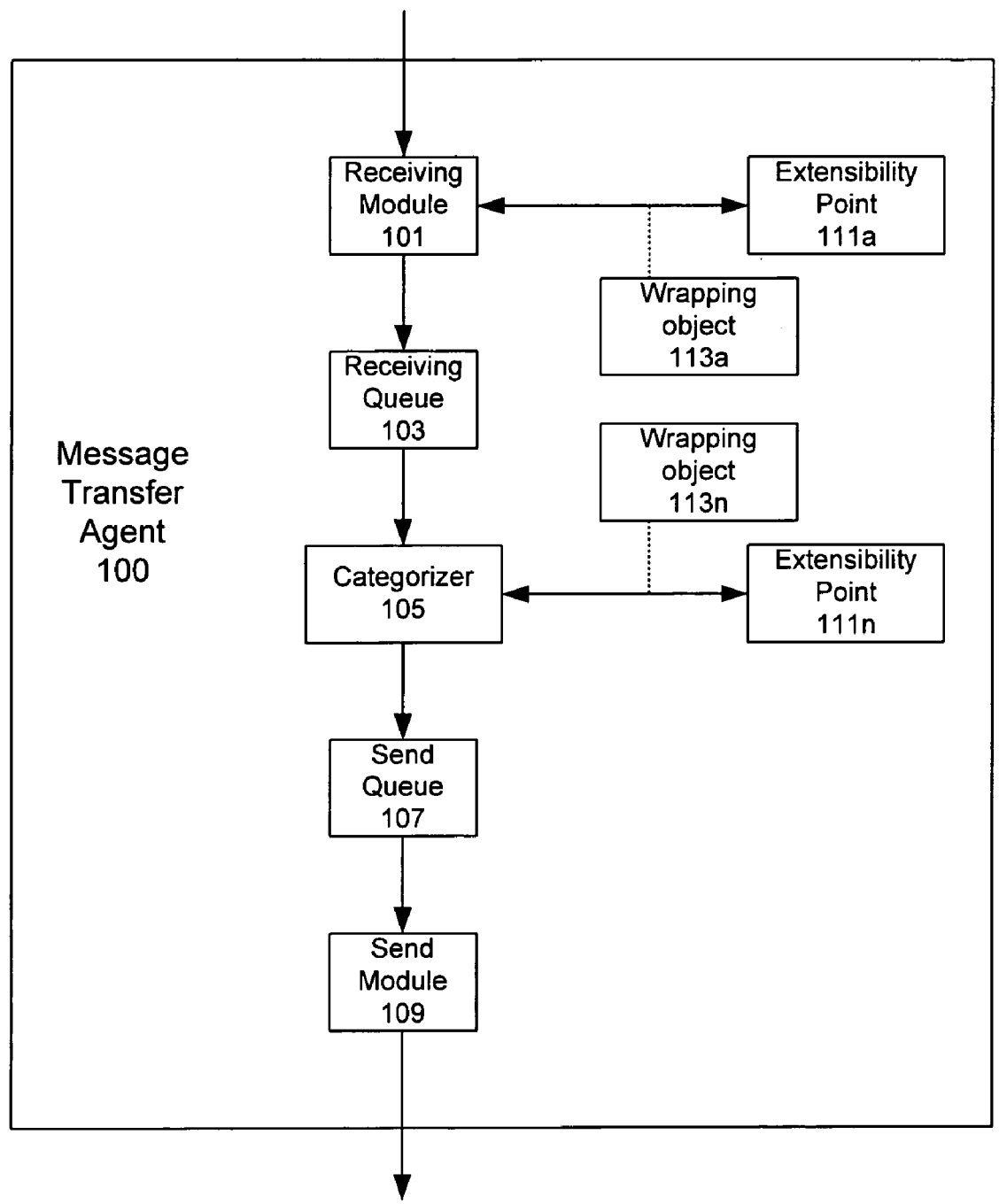
FIG. 1 is a block diagram of an exemplary system for regulating an extensibility point's access to a message in accordance with the present invention.

A block diagram of an exemplary system for regulating an extensibility point's access to a message in accordance with the present invention is shown in FIG. 1. Generally, message transfer agent (MTA) 100 is a processing pipeline that receives incoming email messages and routes the messages to the designated recipients. The incoming messages may be transferred to the MTA over a local area network (LAN) or a wide area network (WAN) such as the Internet. When an incoming message is received, receive module 101 will perform initial processing on the message, typically in accordance with simple mail transfer protocol (SMTP). SMTP is a protocol for sending email messages between servers, and most e-mail systems that send mail over the Internet use SMTP to send messages from one server to another. After the initial processing has been performed, the message is placed in the receive queue 103 with other received messages. Categorizer 105 is the heart of the MTA and performs the necessary categorization and routing procedures on the incoming message. After these procedures have been performed, the message is placed in send queue 107 where it is held until it is ready to be delivered. When the message is ready for delivery, it is submitted to send module 109 which submits the message to the designated end recipients. This delivery is also typically made in accordance with SMTP protocol. When the message is delivered, the end recipients will typically access the message via mail user agent (MUA) software that allows the message to be displayed, read, printed, and, if desired, allows a reply or forwarding message to be composed.

Throughout the MTA processing pipeline 100, a message may be sent to one or more extensibility points 111a-n. Each such extensibility point 111 enables one or more external operations to be performed upon the message. Extensibility points 111a-n allow the performance of operations such as, for example, scanning a message for a virus, determining whether there should be an intercepting party for a message, adding a disclaimer to a message, or ceasing communication with a party sending spam mail. Many of extensibility points 111 may be considered categorizer extensibility points, meaning that at least part of their operations are executed during the categorization and routing procedures 105. However, extensibility points 111 are not limited to categorizer extensibility points and their operations may be executed at any time during MTA processing. For example, operations such as ceasing communication with a party sending spam mail may often be executed when a message is initially received by receive module 101.

As set forth above, due to the wide range of operations which can be executed at an extensibility point 111, the complexity and time required to perform these operations may vary. In simple a case, an extensibility point will receive a message from MTA 100, fully perform its operation on the message, and then return the message to MTA 100 for further processing. In a more complicated case, however, it may not be possible for the extensibility point 111 to fully execute its operation when the message is first received. Accordingly, to avoid unnecessary delay of the transfer and delivery processes, the extensibility point may partially execute its operation, return the message to the MTA 100, and then later re-access the message from the MTA 100 to complete the operation. In this more complicated scenario, the extensibility point 111 may flag the message prior to returning it to the MTA 100. The extensibility point 111 will remove the flag only after it has re-accessed the message and completed and its operation. To ensure that the message will not be distributed until the operation is completed, MTA 100 will not distribute the message until the flag has been removed.

When a flagged message is returned to MTA 100, processing of the message will continue until the message is re-accessed by the extensibility point 111. Thus, the extensibility point 111 may re-access the message from a different module or procedure than from which it initially accessed the message. For example, an extensibility point may initially access a message from categorizer 105, execute part of its operations on the message, and then return the message to the categorizer 105. MTA 100 may then resume and complete the categorization and routing procedures and submit the message to the send queue 107. When the extensibility point 111 is ready to complete its operations, it will re-access the message from the send queue 107 rather than from the categorizer 105 from which it initially accessed the message.

As also set forth above, while enabling an extensibility point to return and later re-access a message creates improved processing efficiency, it also results in a number of message accessing problems. For example, an extensibility point 111 may attempt to inappropriately access a message after it has already completed its operation on the message. In some cases, an extensibility point 111 may even attempt to inappropriately access a message on which it is not intended to perform any operation at all or which is meant to be handed over to a different extensibility point. To reduce these and other accessing problems, the present invention employs the use of a wrapper object 113.

Generally, a wrapper object 113 regulates an extension's point's access to a message. Each such wrapper object may be unique to a particular message and to a particular extensibility point 111. A single message may be wrapped in multiple wrapper objects, one for each extensibility point to which the message is sent. Also, if multiple messages are sent to the same extensibility point, each such message may be wrapped within a different wrapper object. The wrapper object 113 references the message that it wraps and contains definitions of the entry points to the message. The wrapper object 113 can be validated by an extensibility point 111 when it is ready to begin its operation on the message. Validation of the wrapper object enables the extensibility point 111 to access the message. The wrapper object 113 can later be invalidated by the extensibility point 111 after it is has completed its operation on the message. Invalidation of the wrapper object denies the extensibility point access to the message. If, for example, the extensibility point 111 has only partially executed its operation on the message, then it can return the message to the MTA 100 with the wrapper object 113 still validated and then access the message at a later time.

Figure 2:
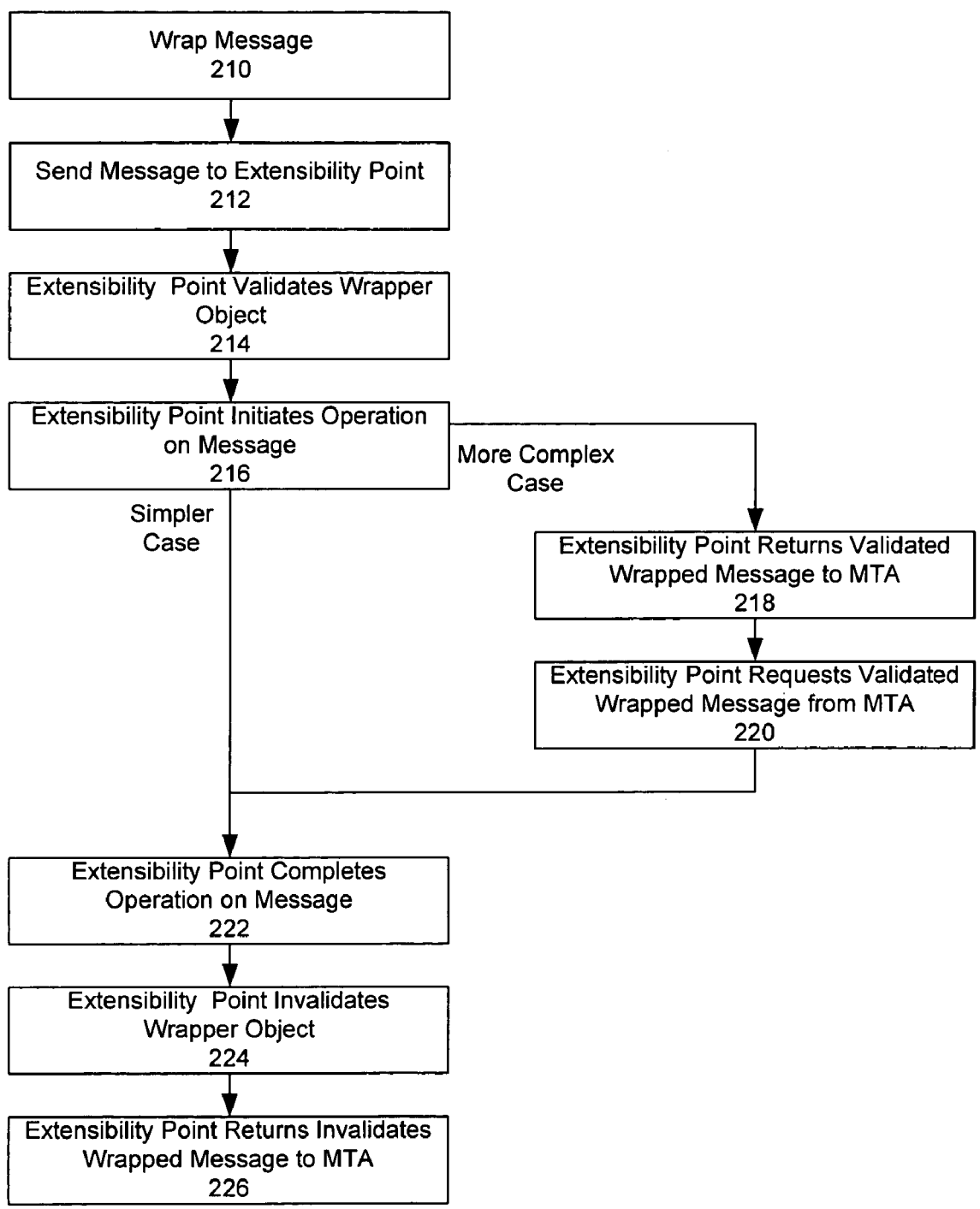
FIG. 2 is a flowchart of an exemplary method for regulating an extensibility point's access to a message in accordance with the present invention.

A flowchart of an exemplary method for regulating an extensibility point's access to a message in accordance with the present invention is shown in FIG. 2. At act 210, prior to handing a message over to an extensibility point 111, MTA 100 wraps the message with a wrapper object 113. When it is validated, the wrapper object is configured to provide the extensibility point 111 with access to access to the message. When it is invalidated, the wrapper object is configured to deny the extensibility point 111 access to access to the message. At act 212, MTA 100 submits the wrapped message to the extensibility point 111 so that it can begin to execute its operation on the message. At act 214, extensibility point 111 validates the wrapper object so that it can access the message. At act 216, the extensibility point 111 initiates its operations on the message.

For simple cases, extensibility point 111 will complete its operation on the message at act 222 without first returning the message to the MTA 100. For more complex cases, however, at act 218, extensibility point 111 may return the validated wrapped message to MTA 100 prior to completing its operations on the message. This return enables MTA 100 to continue processing the message while extensibility point 111 waits until it can efficiently continue its operation on the message. If desired, extensibility point 111 may flag the message at this time to indicate that its operation on the message is not complete. At act, 220, when extensibility point 111 is ready to continue its operation, it requests the message back from MTA 100. Extensibility point 111 may need to request the message from a different module or process within MTA 100 than from which the message was initially requested. The validated wrapped message may be passed back and forth between extensibility point 111 and MTA 100 any number of times prior to the completion of the operations at act 222. At act 224, after completing its operation, the extensibility point 111 invalidates the wrapper object and is no longer able to access the message. If desired, any flags that extensibility point 111 has set on the message may be removed upon invalidation of the wrapper object to ensure that the distribution of the message is not inappropriately delayed. At act 226, extensibility point 111 returns the invalidated wrapped message to MTA 100 so that its processing may be completed. If the extensibility point 111 attempts to access the message after the wrapper object has been invalidated, then MTA 100 may generate an exception or the unauthorized access may simply have no effect.

Accordingly, as set forth above with reference to the exemplary systems and methods of FIGS. 1 and 2, the present invention provides systems and methods for regulating an extensibility point's access to a message. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 3:
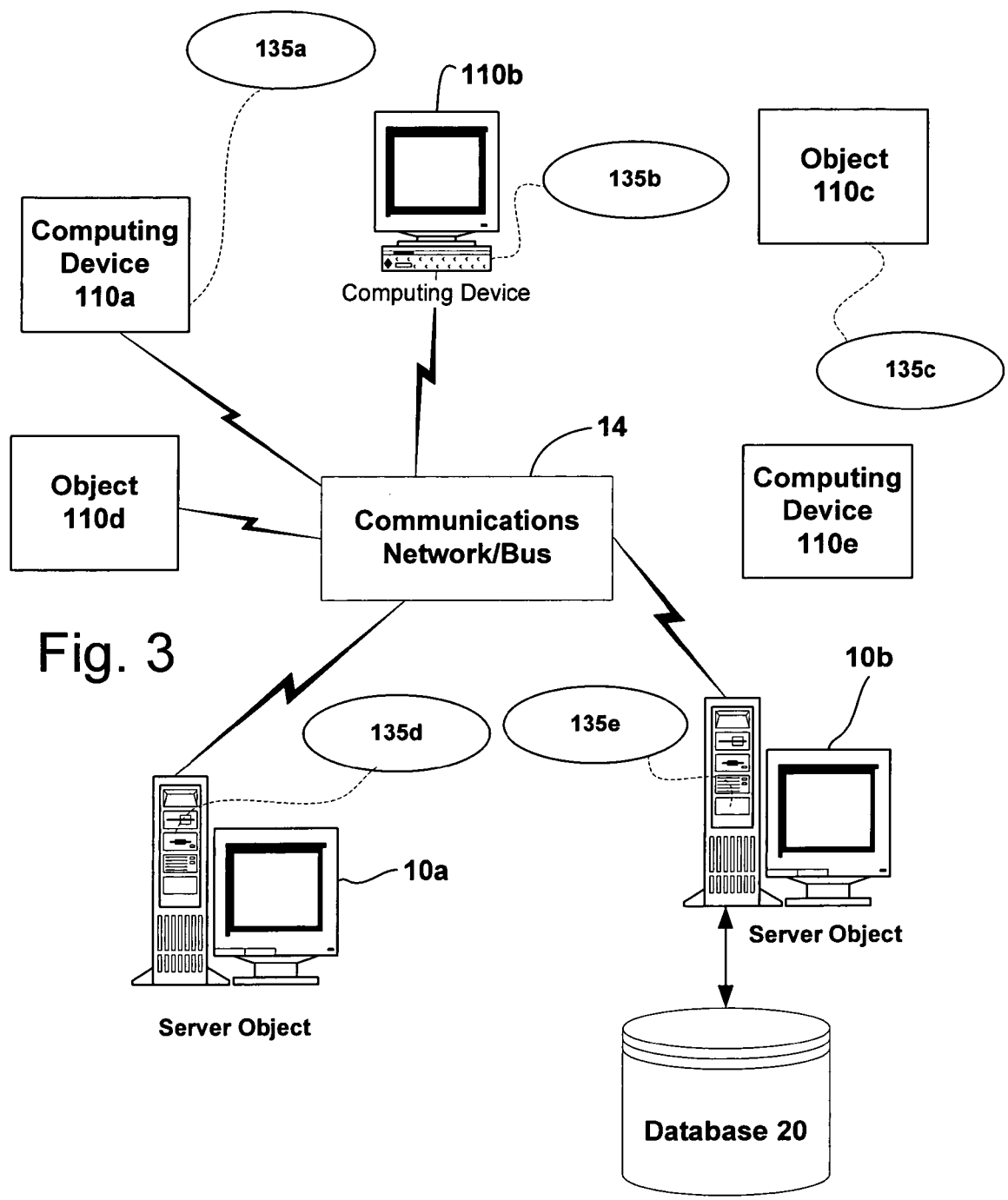
FIG. 3 is a block diagram representing an exemplary network environment having a variety of computing devices in which the present invention may be implemented.

FIG. 3 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 3 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof.

Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 4:
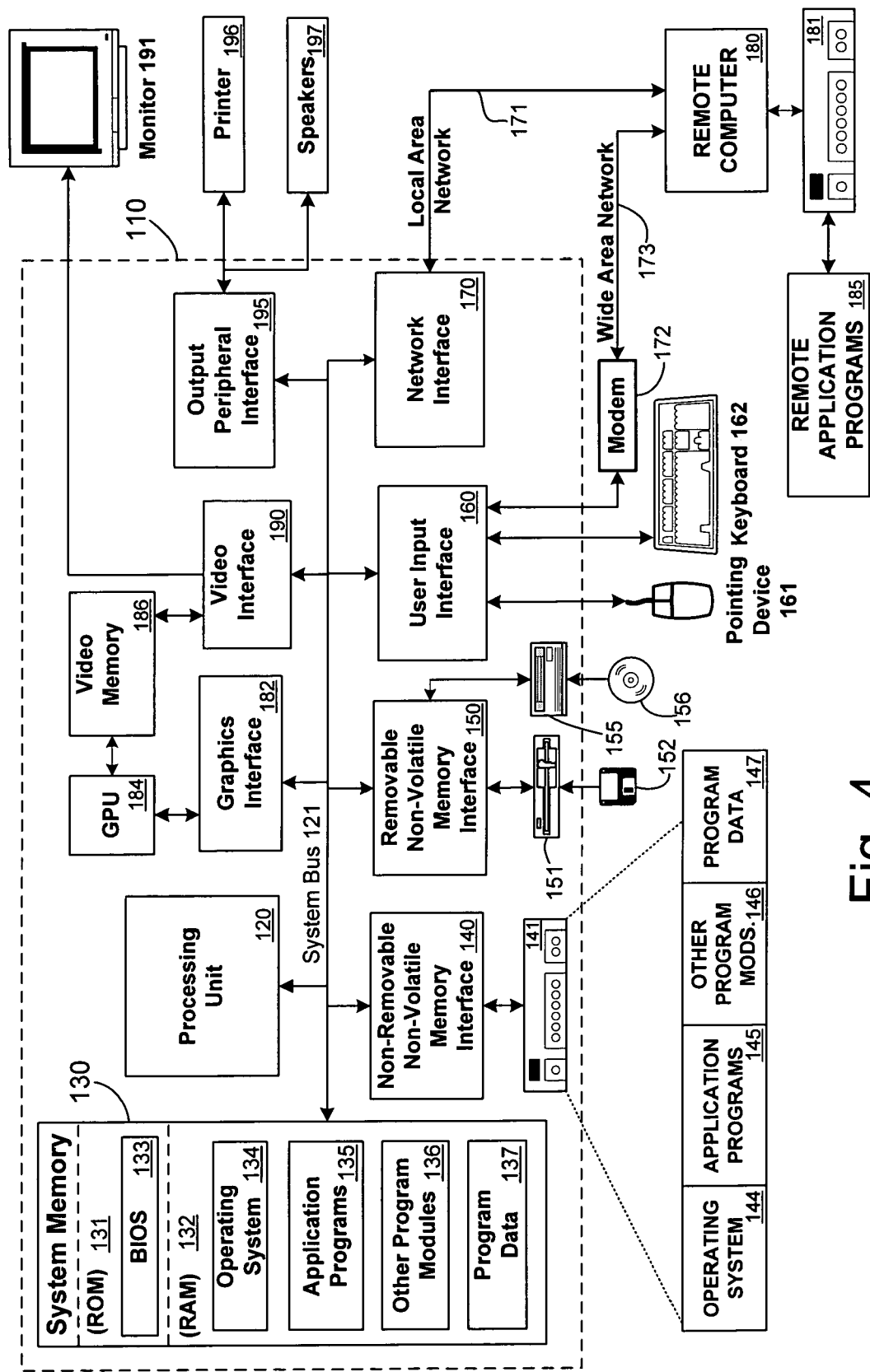
FIG. 4 is a block diagram of an exemplary representing an exemplary computing device in which the present invention may be implemented.

FIG. 4 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 4 thus illustrates an example of a suitable computing system environment 400 in which the invention may be implemented, although as made clear above, the computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

CONCLUSION

Thus, systems and methods for regulating an extensibility point's access to a message regulating an extensibility point's access to a message have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for regulating an extensibility point's access to an email message within an email message transfer agent, the method comprising:
   wrapping by the email message transfer agent the email message with a wrapper object that provides the extensibility point with access to the email message when the wrapper object is validated by the extensibility point and denies the extensibility point access to the message when the wrapper object is invalidated by the extensibility point;
   sending by the email message transfer agent the wrapped email message to the extensibility point within the email message transfer agent;
   receiving the validated wrapped message back from the extensibility point prior to a completion of its operation on the email message;
   proceeding with processing the email message;
   receiving an indication from the extensibility point that it is ready to continue its operation on the email message; and
   returning the validated wrapped email message to the extensibility point.

2. The method of claim 1, further comprising wrapping the email message with another wrapper object associated with another extensibility point.

3. The method of claim 1, comprising proceeding with processing the email message by sending the email message to a send queue.

4. The method of claim 1, further comprising generating an exception when the extensibility point attempts to access the invalidated wrapped email message.

5. The method of claim 1, further comprising sending the wrapped email message to a categorizer extensibility point.

6. The method of claim 1, further comprising sending the wrapped email message to a receiving module extensibility point.

7. A system for regulating an extensibility point's access to an email message within an email message transfer agent, the system comprising:
   at least one computing device;
   the extensibility point of the email message transfer agent;
   a wrapper object that provides the extensibility point with access to the email message when the wrapper object is validated by the extensibility point and denies the extensibility point access to the email message when the wrapper object is invalidated by the extensibility point; and
   the email message transfer agent that
     wraps the email message with the wrapper object prior to sending the email message to the extensibility point within the email message transfer agent,
     receives the validated wrapped message back from the extensibility point prior to a completion of its operation on the email message,
     proceeds with processing the email message,
     receives an indication from the extensibility point that it is ready to continue its operation on the email message, and
     returns the validated wrapped email message to the extensibility point.

8. The system of claim 7, wherein the extensibility point is a categorizer extensibility point.

9. The system of claim 7, wherein the extensibility point is a receiving module extensibility point.

10. The system of claim 7, wherein the extensibility point returns the validated wrapped email message to the email message transfer agent and then later receives the validated wrapped email message back from the email message transfer agent.

11. The system of claim 7, wherein the email message is wrapped with another wrapper object associated with another extensibility point.

12. The system of claim 7, wherein the email message transfer agent generates an exception when the extensibility point attempts to access the invalidated wrapped object.

13. A computer readable medium for regulating an extensibility point's access to a message within an email message transfer agent, the computer readable medium having computer executable instructions stored upon and executed by computing device for performing steps comprising:
   wrapping by the email message transfer agent the email message with a wrapper object that provides the extensibility point with access to the email message when the wrapper object is validated by the extensibility point and denies the extensibility point access to the email message when the wrapper object is invalidated by the extensibility point;
   sending by the email message transfer agent the wrapped email message to the extensibility point within the email message transfer agent;
   receiving the validated wrapped message back from the extensibility point prior to a completion of its operation on the email message;
   proceeding with processing the email message;
   receiving an indication from the extensibility point that it is ready to continue its operation on the email message; and
   returning the validated wrapped email message to the extensibility point.

14. The computer readable medium of claim 13, further comprising computer executable instructions for wrapping the email message with another wrapper object associated with another extensibility point.

15. The computer readable medium of claim 13, further comprising computer executable instructions for generating an exception when the extensibility point attempts to access the invalidated wrapped email message.

16. The computer readable medium of claim 13, wherein the extensibility point is a categorizer extensibility point.

17. The computer readable medium of claim 13, wherein the extensibility point is a receiving module extensibility point.

18. The computer readable medium of claim 13, wherein the computer executable instructions stored upon and executed by computing device for proceeding with processing the email message comprise computer executable instructions for sending the email message to a send queue.

* * * * *